(12) United States Patent
Becker et al.

(10) Patent No.: US 9,315,084 B2
(45) Date of Patent: Apr. 19, 2016

(54) ADJUSTABLE LIMIT BAR WITH SWAY CONTROL

(71) Applicant: AGCO Corporation, Hesston, KS (US)

(72) Inventors: Tony Becker, Jackson, MN (US); Donald Scott Hansen, Fairmont, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/574,818

(22) Filed: Dec. 18, 2014

(65) Prior Publication Data

US 2015/0202936 A1    Jul. 23, 2015

Related U.S. Application Data

(60) Provisional application No. 61/917,729, filed on Dec. 18, 2013.

(51) Int. Cl.
*B60G 9/00*    (2006.01)
*B60G 9/02*    (2006.01)

(52) U.S. Cl.
CPC  *B60G 9/022* (2013.01); *B60G 9/00* (2013.01); *B60G 2200/30* (2013.01); *B60G 2204/45* (2013.01); *B60G 2204/4502* (2013.01); *B60G 2204/4504* (2013.01); *B60G 2300/08* (2013.01); *B60G 2300/082* (2013.01)

(58) Field of Classification Search
CPC .... B60G 7/04; B60G 17/015; B60G 17/0155; B60G 99/004; B60G 9/00; B60G 11/27; B60G 11/62; B60G 2204/45; B60G 2204/4504; B60G 2300/08; B60G 2300/082; B60G 2200/30; B60G 2204/4502; B60G 9/022; F16F 9/58
See application file for complete search history.

(56) References Cited

U.S. PATENT DOCUMENTS

| | | | | |
|---|---|---|---|---|
| 2,742,301 | A * | 4/1956 | Pointer | 280/683 |
| 3,966,223 | A * | 6/1976 | Carr | 280/124.128 |
| 5,199,690 | A * | 4/1993 | Marshall | 267/64.25 |
| 5,749,566 | A * | 5/1998 | Vitale et al. | 267/64.23 |
| 7,168,717 | B2 * | 1/2007 | Wubben et al. | 280/124.127 |
| 7,396,028 | B2 * | 7/2008 | Smith | 280/124.116 |
| 7,681,898 | B2 * | 3/2010 | Mullican et al. | 280/124.162 |

* cited by examiner

*Primary Examiner* — Laura Freedman (57) ABSTRACT

An adjustable limit bar assembly for a suspension system includes an elongated member having a longitudinal axis and an attachment mechanism disposed on an end of the elongated member and configured for attachment to a vehicle frame component. First bumper and second bumpers are co-axially disposed on the elongated member and spaced from a plate connected to an axle by a distance, wherein the distance is adjustable.

12 Claims, 8 Drawing Sheets

FIG. 8

ADJUSTABLE LIMIT BAR WITH SWAY CONTROL

CROSS REFERENCE TO RELATED APPLICATION

This application claims the benefit of U.S. Provisional Application No. 61/917,729, entitled ADJUSTABLE LIMIT BAR FOR SWAY CONTROL, filed Dec. 18, 2013, which is hereby incorporated by reference in its entirety.

BACKGROUND OF THE INVENTION

1. Field of Invention

This invention relates generally to land vehicles such as agricultural machines, and more particularly to suspension systems for such vehicles.

2. Description of Related Art

Some agricultural spray application machines, tractors, other agricultural equipment comprise a vehicle chassis. The suspension in some agricultural machines incorporates the use of airbags underneath the frame rails of the chassis to dampen vibrations, bumps, and other turbulence, thereby providing a more comfortable ride. However, the air bags are flexible, thereby allowing, in some cases, more vehicle sway than a user may desire. Moreover, the air bags may be relatively fragile compared to other components of the vehicle chassis, and excessive flexing of the suspension may result in damage to the airbags.

SUMMARY

In one aspect, the invention is directed to a suspension system of a vehicle connecting a plurality of ground engaging wheels to a frame rail of the vehicle. The suspension system includes a forward axle and a rear axle, each axle connected to at least one of the plurality of ground engaging wheels, each of the forward and rear axle comprising a generally horizontal plate. The suspension system includes at least one cushioning airbag mounted between the forward axle and the frame rail and at least one airbag mounted between the rear axle and the frame rail. The suspension system includes a plurality of adjustable limiting assemblies configured to limit the relative vertical travel between the frame rail and the forward and rear axles. Each of the plurality of adjustable limiting assemblies includes an elongated member having a longitudinal axis and an attachment mechanism disposed on an end of the elongated member and configured for attachment to the frame rail. The adjustable limiting assembly also includes a first bumper having a first spring rate and being co-axially disposed on the elongated member, the first bumper being positioned above the horizontal plate and a second bumper having a second spring rate and being co-axially disposed on the elongated member and spaced from the first bumper, the second bumper being positioned below the horizontal plate. The adjustable limiting assembly also includes a controller for adjusting the adjustable limiting assembly with respect to the horizontal plate in a range between a first position wherein the first bumper is proximate the plate and a second position wherein the second bumper is proximate the plate.

In another aspect, a system comprises an apparatus and a controller. The apparatus comprises an elongated member having a longitudinal axis; an attachment mechanism disposed on an end of the elongated member and configured for attachment to a vehicle frame component; a first bumper co-axially disposed on the elongated member; and a second bumper co-axially disposed on the elongated member and spaced from the first bumper by a distance, wherein the distance is adjustable. The controller adjusts the distance and comprises a computer processor.

In yet another aspect, a system comprises an apparatus and a third bumper. The apparatus comprises an elongated member having a longitudinal axis; an attachment mechanism disposed on an end of the elongated member and configured for attachment to a vehicle frame component; a first bumper having a first spring rate and being co-axially disposed on the elongated member; and a second bumper having a second spring rate and being co-axially disposed on the elongated member and spaced from the first bumper by a distance, wherein the distance is adjustable. The third bumper has a third spring rate, wherein the third bumper is configured for substitution for either the first bumper or the second bumper in the apparatus.

In still another aspect, a system comprises an apparatus and a generally horizontal plate disposed on a vehicle. The apparatus comprising an elongated member having a longitudinal axis; an attachment mechanism disposed on an end of the elongated member and configured for attachment to a vehicle frame component; a first bumper having a first spring rate and being co-axially disposed on the elongated member; and a second bumper having a second spring rate and being co-axially disposed on the elongated member and spaced from the first bumper by a distance, wherein the distance is adjustable. The generally horizontal plate is disposed on a vehicle, the first bumper being positioned above the plate and the second bumper being positioned below the plate. The apparatus is movable with respect to the plate in a range between a first position wherein the first bumper is proximate the plate and a second position wherein the second bumper is proximate the plate.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure describes adjustable limit bars configured to be attachable to a vehicle frame to thereby limit vertical movement of the frame relative to the axles, leading to a reduction in the amount of sway the vehicle experiences. This leads to a ride that feels more secure to the operator and limits excessive flexing of the air bags, thereby increasing the longevity of the air bags. One embodiment of an adjustable limit bar is a rod having bumpers on two ends to control how much the vehicle rolls from one side to the other. In an exemplary embodiment, the distance between the bumpers is adjustable to change the extent of sway (i.e., roll) that the vehicle experiences. Moreover, in exemplary embodiments, the bumpers may be replaced with other bumpers to change a spring rate of the system.

Figure 1:
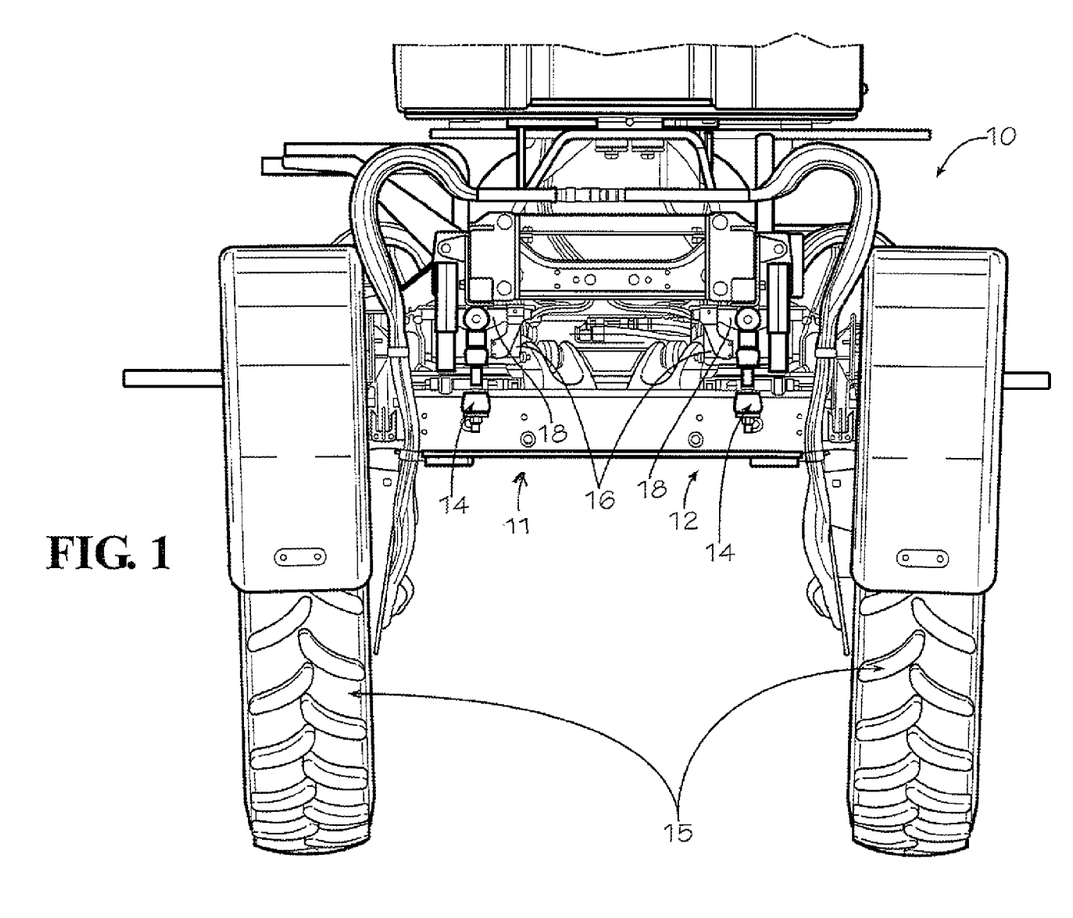
FIG. 1 is a partial rear elevation view of an agricultural vehicle having an exemplary embodiment of an adjustable limit bar assembly of the present disclosure.

FIG. 1 is a partial rear elevation view of an agricultural vehicle 10 with a suspension system 11 having an exemplary embodiment of an adjustable limit bar assembly 12 of the present disclosure. In some embodiments, vehicle 10 is a spray application machine. Suitable vehicles 10 on which the disclosed adjustable limit bar assembly of the present disclosure may be used include tractors and other machines. One such machine is a RoGator™ application machine, model RG700, commercially available from AGCO Corporation of Duluth, Ga. In one embodiment, the suspension system 11 has an adjustable limit bar assembly 12 of the present disclosure comprising four adjustable limit bars 14 adjacent ground engaging wheels 15 of the vehicle 10. One adjustable limit bar 14 is installed proximate each of four air bags 16 positioned under a frame rail of vehicle 10 near the four wheels 15 of vehicle 10. In an exemplary embodiment, each adjustable limit bar 14 is mounted to an air bag bracket 18.

Figure 2:
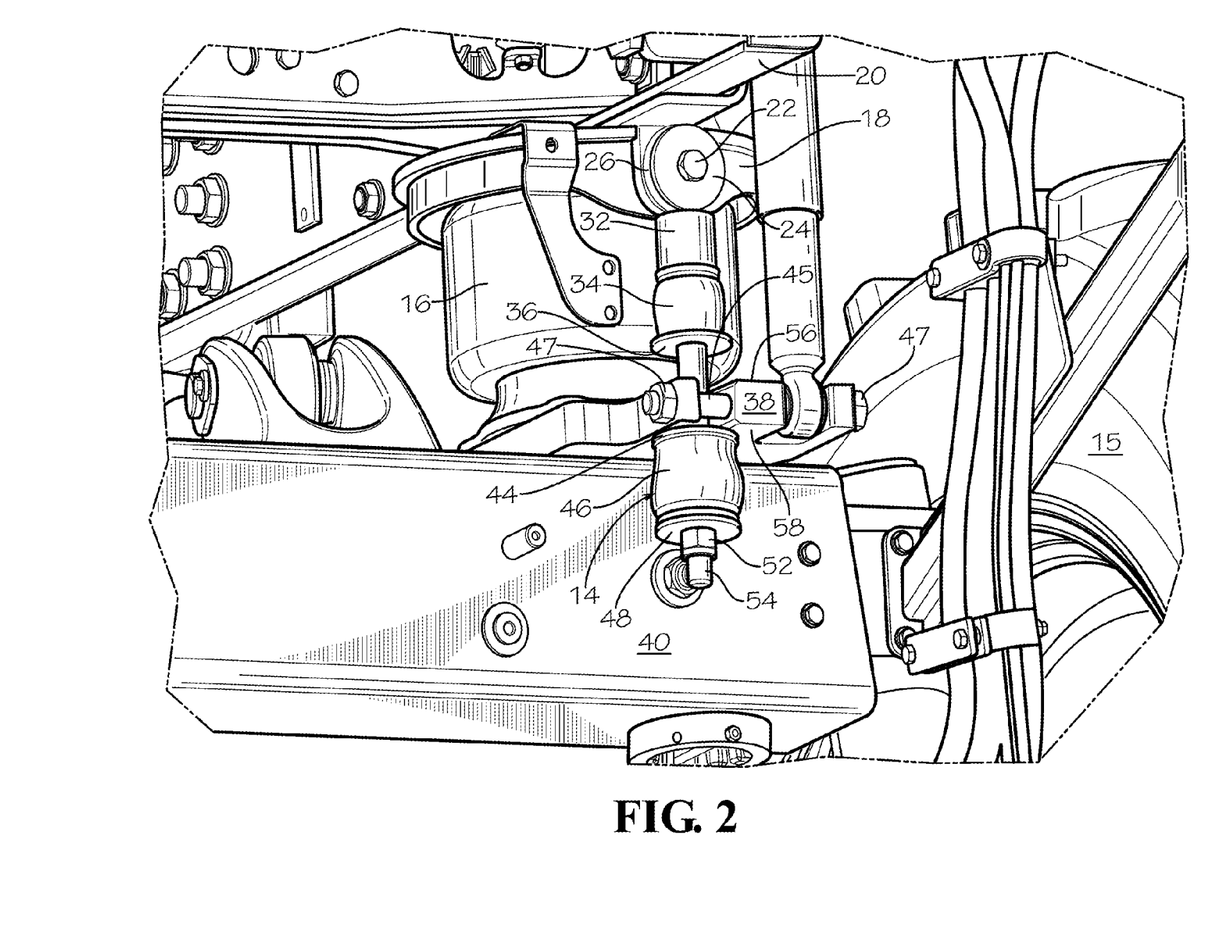
FIG. 2 is a partial rear perspective view an adjustable limit bar of the system of FIG. 1.
Figure 3:
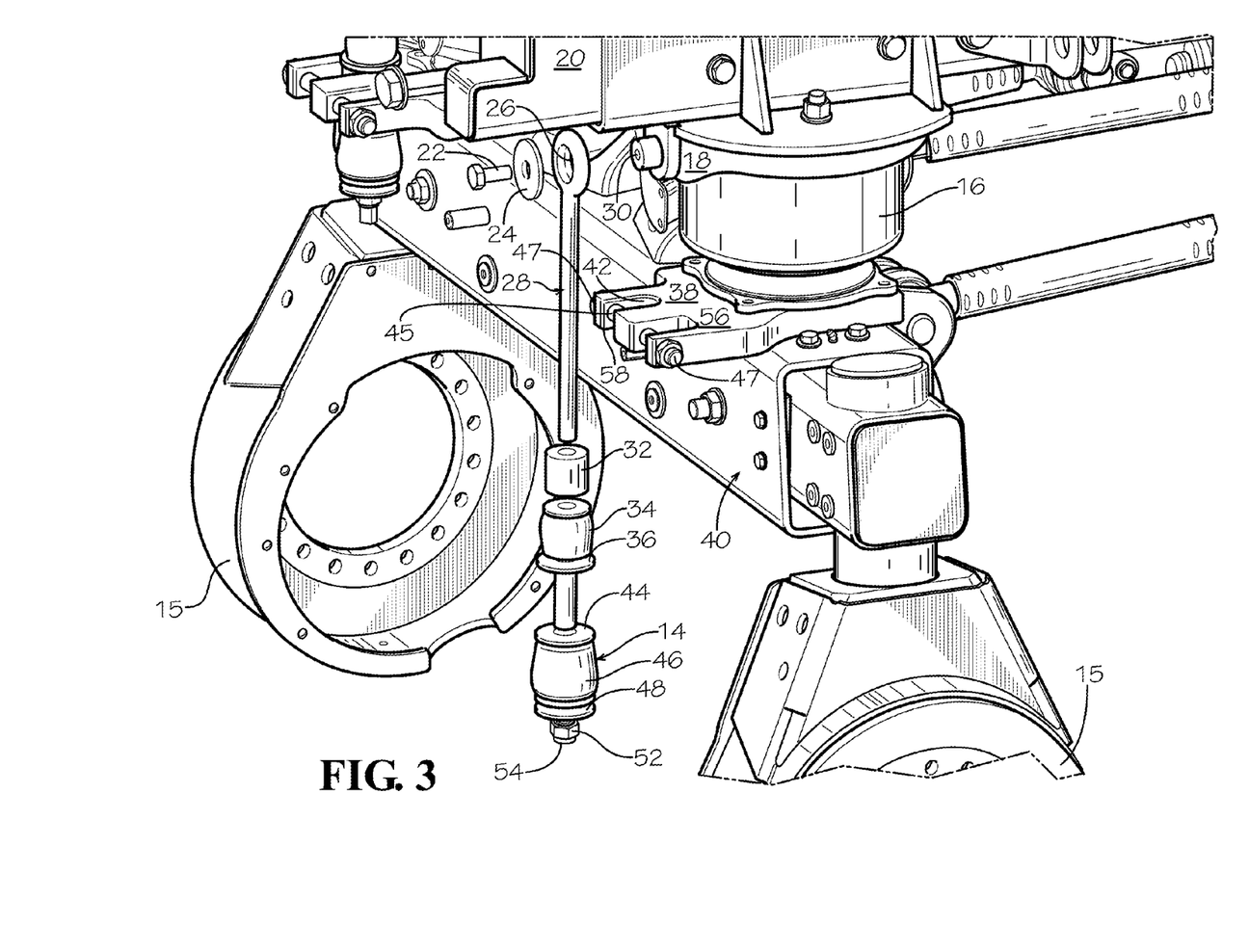
FIG. 3 is a partial rear and side perspective view of the adjustable limit bar of FIG. 2 in exploded form, and wherein the tires of the wheels of FIG. 1 are removed for clarity.
Figure 4:
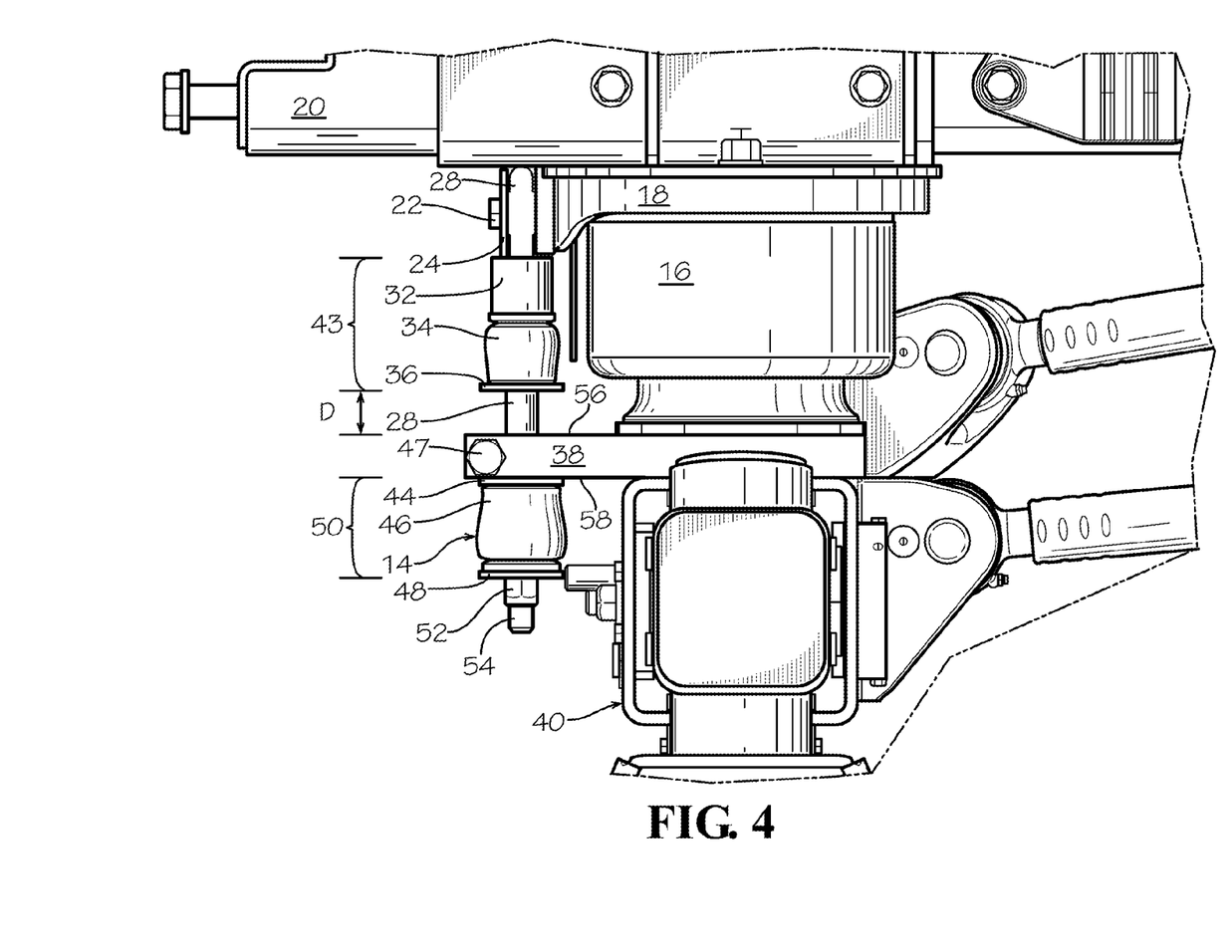
FIG. 4 is a partial side elevation view of an assembled adjustable limit bar of FIGS. 1-3.

FIG. 2 is a partial rear perspective view an adjustable limit bar 14 of assembly 12 of FIG. 1. FIG. 3 is a partial rear and side perspective view of adjustable limit bar 14 of FIG. 2 in exploded form, and wherein the tires of the wheels 15 of vehicle 10 are removed for clarity. FIG. 4 is a partial side elevation view of assembled adjustable limit bar 14 of FIGS. 1-3. In an exemplary embodiment, each adjustable limit bar 14 is mounted to its respective air bag bracket 18, which is in turn fixed to frame rail 20. In an exemplary embodiment, bolt 22 passes through washer 24 and an attachment mechanism such as eye 26 of an elongated member such as eyebolt 28 to thread ably engage with aperture 30 of a vehicle frame component such as air bag bracket 18.

In an exemplary embodiment, eyebolt 28 is externally threaded. Bushing 32, top bumper 34 and washer 36 are co-axially assembled on eyebolt 28 above generally horizontal plate 38 of axle 40, thereby forming top bumper assembly 43. (FIG. 4). Eyebolt 28 passes through passage 42 of plate 38. Washer 44, bottom bumper 46 and washer 48, forming bottom bumper assembly 50, are co-axially retained on eyebolt 28 below plate 38 of axle 40, by retention means such as nut 52. Nut 52 threadably engages bottom end 54 of eyebolt 28 to secure bottom bumper assembly 50 thereto. A portion of eyebolt 28 is positioned in passage 42 through plate 38. In an exemplary embodiment, eyebolt 28 is held within passage 42 by bolt 45, which is removably secured in plate 38 by nuts 47. In another embodiment, the passage through plate 38 could be configured as a hole or channel of another configuration. Moreover, plate 38 need not be substantially flat; portions thereof can have other configurations.

Each airbag 16 is disposed to separate and urge apart its respective frame rail 20 and axle 40. In use, limit bar 14 limits the relative vertical travel of frame rail 20 and axle 40 to the distance between washer 36 of top bumper assembly 43 and washer 44 of bottom bumper assembly 50, minus the thickness of plate 38, plus the amount of any compression of top bumper 34 and bottom bumper 46. When washer 36 of top bumper assembly 43 hits top surface 56 of plate 38 and top bumper 34 compresses, frame rail 20 and axle 40 are at their minimum distance from each other (i.e., top bumper 34 is proximate plate 38). When washer 44 of bottom bumper assembly 50 hits bottom surface 58 of plate 38 and bottom bumper 46 compresses, frame rail 20 and axle 40 are at their maximum distance from each other (i.e., bottom bumper 46 is proximate plate 38). The washers 36, 44 effectively distribute the force of impact across a contact surface of the bumpers 34, 46, respectively to prevent uneven wear on the bumpers 34, 46. In an exemplary embodiment, bushing 32 acts as a spacer. The distance between washer 36 of top bumper assembly 43 and washer 44 of bottom bumper assembly 50 is adjustable by substituting bushings 32 of different heights and adjusting the placement of bottom nut 52. Thus, limit bar 14 is adjustable to limit the relative vertical travel between frame rail 20 and axle 40 to a range desired by the user. Top and bottom bumpers 34, 46 cushion and dampen the impact of washers 36, 44 against plate 38.

In an exemplary embodiment, a vertical travel range is defined by distance D (see FIG. 4) between washer 36 and top surface 56 of plate 38 when washer 44 is flush with bottom surface 58 of plate 38. In an exemplary embodiment, distance D is about 38 mm plus a potential 25 mm deformation of top bumper 34 and a potential 29 mm deformation of bottom bumper 46. Elastomer bumpers from a wide number of manufacturers are suitable for use as top bumper 34 and bottom bumper 46. A particularly suitable bumper for use as top bumper 34 is commercially available from Miner Elastomer Products Corporation of Geneva, Ill., as model GBA-12. A particularly suitable bumper for use as bottom bumper 46 is commercially available from Miner Elastomer Products Corporation of Geneva, Ill., as model GBA-15. Bumpers having other sizes and spring rates can be chosen to replace one or both of top and bottom bumpers 34, 46 to vary the spring rate of assembly 12 as desired. Appendix A lists characteristics of several bumpers from Miner Elastomer Products Corporation in the "GBA Bumpers" product line. Moreover, additional or fewer bumpers can be used on limit bar 14 to increase or decrease the spring rate of assembly 12, as desired. In an exemplary embodiment, bottom bumper 46 is larger and stiffer (i.e., has a higher spring rate) than top bumper 34 to accommodate the higher impact forces experienced by bottom bumper 46. While the use of elastomer bumpers for top and bottom bumpers 34, 46 is illustrated and described, it is contemplated that other spring mechanisms may also be used, such as, for example, helical springs and leaf springs.

Figure 5:
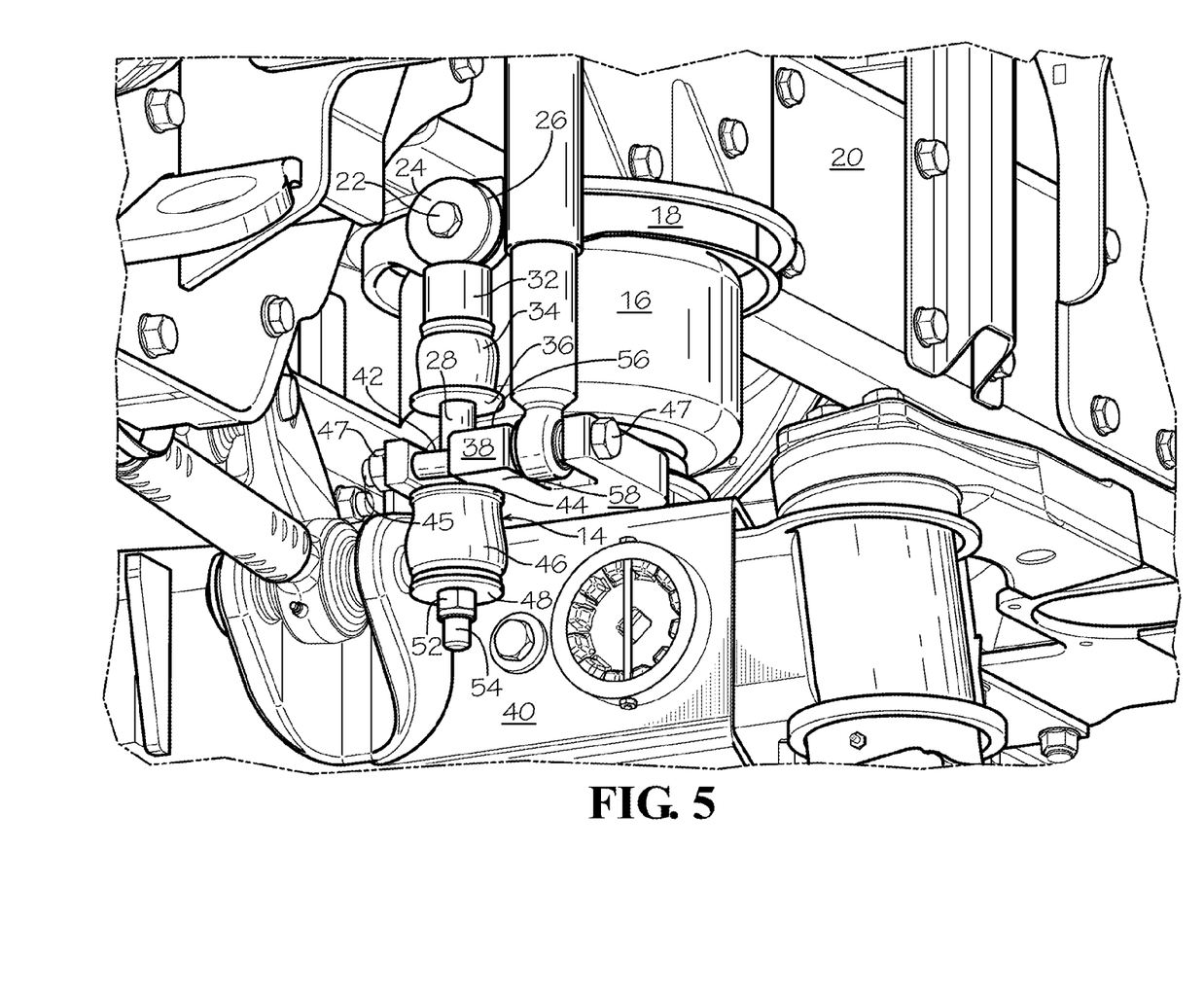
FIG. 5 is a partial front perspective view of the agricultural vehicle of FIG. 1, showing an adjustable limit bar mounted to a vehicle frame at the front of the vehicle.

FIG. 5 is a partial front perspective view of the agricultural vehicle 10 of FIG. 1, showing an adjustable limit bar 14 mounted to a vehicle frame rail 20 at the front of the vehicle 10. Thus, an exemplary vehicle 10 has four adjustable limit bars 14, one positioned proximate each of the four air bags 16, which are in turn positioned proximate each of the four wheels 15. By limiting vertical movement between frame rail 20 and axle 40 at each of the four locations through the use of the adjustable limit bars 14, the adjustable limit bar assembly 12 of the present disclosure controls the amount of roll or sway that vehicle 10 experiences. Such control also prevents excessive flexing of air bags 16, thereby contributing to increased air bag durability.

Figure 6:
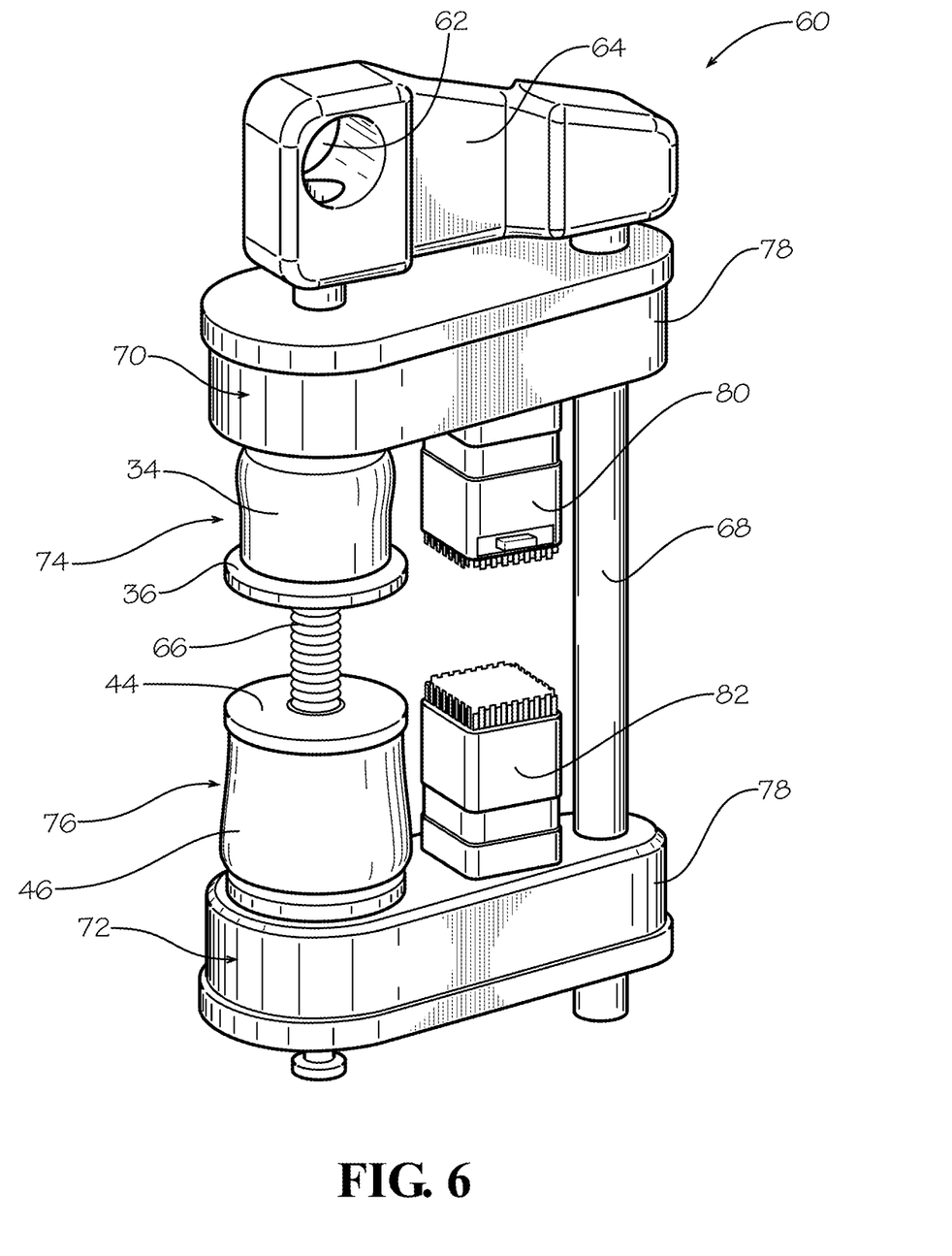
FIG. 6 is a perspective view of a second exemplary embodiment of an adjustable limit bar.
Figure 8:
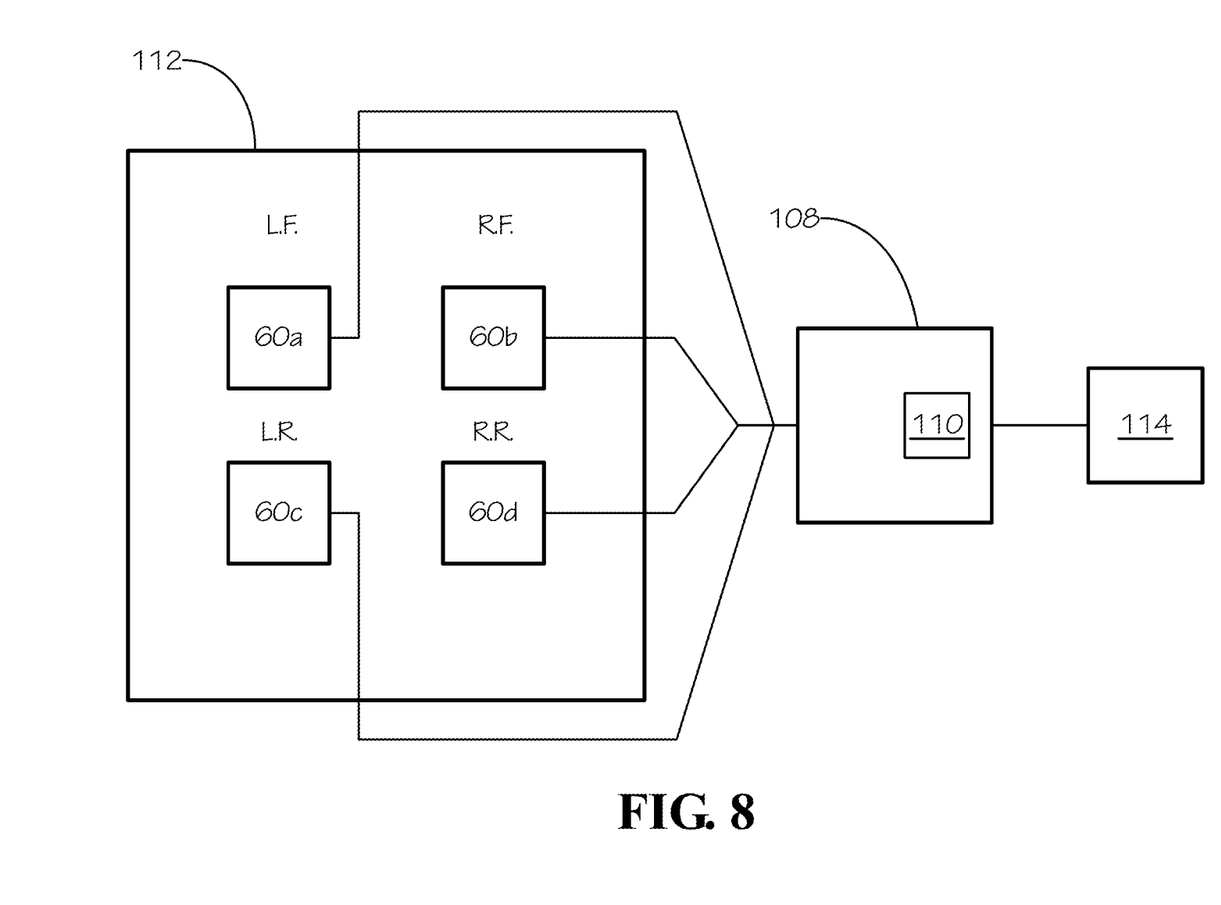
FIG. 8 is a schematic diagram illustrating components of an exemplary embodiment of an adjustable limit bar assembly.

FIG. 6 illustrates a second embodiment of an adjustable limit bar 60 that is remotely and/or automatically adjustable by a user using a computerized controller. In a second embodiment of an adjustable limit bar assembly 112 (FIG. 8), adjustable limit bar 60 replaces adjustable limit bar 14. While adjustable limit bar 60 is illustrated in isolation in FIG. 6, its installation and use will be discussed with respect to the vehicle 10 and its components illustrated in FIGS. 1-5. In an exemplary embodiment, four adjustable limit bars 60 are mounted, one to each of four air bag brackets 18, which are in turn fixed to frame rails 20. As shown in FIG. 8, the adjustable limit bars 60 of adjustable limit bar assembly 112 include left front limit bar 60a, right front limit bar 60b, left rear limit bar 60c and right rear limit bar 60d. In some applications, each of the four limit bars 60a, 60b, 60c and 60d of a vehicle 10 are configured identically. In yet another application, the two front limit bars 60a and 60b may be identical, and the two rear limit bars 60c, 60d may be identical. In yet other applications, each of the limit bars 60a, 60b, 60c, 60d may be customized to a particular vehicle. For example, for a particular vehicle that is heaviest at the left rear portion of the vehicle, left rear limit bar 60c may have larger and/or stiffer bumpers than the other limit bars 60a, 60b and 60c.

Referring to FIGS. 2 and 6, in an exemplary embodiment, bolt 22 passes through aperture 62 of an attachment mechanism such as mounting bracket 64 to threadably engage with aperture 30 of air bag bracket 18. Aperture 62 may be configured differently than illustrated, and/or another component may be used therewith, to offer a secure attachment to air bag bracket 18. Elongated members such as externally threaded screw 66 and guide rod 68 extend downwardly from mounting bracket 64. Upper motor housing 70 and lower motor housing 72 are slideable along guide rod 68 and are movable along externally threaded screw 66, as discussed below.

Top bumper 34 and washer 36 are co-axially assembled on screw 66 above plate 38 of axle 40, thereby forming top bumper assembly 74. Screw 66 passes through passage 42 of plate 38. Washer 44 and bottom bumper 46, forming bottom bumper assembly 76, are co-axially retained on screw 66 below plate 38 of axle 40. Top bumper assembly 74 is connected to upper motor housing 70 to travel along screw 66 therewith. Similarly, bottom bumper assembly 76 is connected to lower motor housing 72 to travel along screw 66 therewith. Distal ends 78 of upper and lower motor housings 70, 72 are supported on guide rod 68 for slideable movement thereon, thereby preventing canting of the motor housings 70, 72 as they move along screw 66. In an exemplary embodiment, screw 66 is held within passage 42 by bolt 45, which is removably secured in bracket by nuts 47.

In use, limit bar 60 limits the relative vertical travel of frame rail 20 and axle 40 to the distance between washer 36 of top bumper assembly 74 and washer 44 of bottom bumper assembly 76, minus the thickness of plate 38, plus the amount of any compression of top bumper 34 and bottom bumper 46. When washer 36 of top bumper assembly 74 hits top surface 56 of plate 38 and top bumper 34 is compressed, frame rail 20 and axle 40 are at their minimum distance from each other. When washer 44 of bottom bumper assembly 76 hits bottom surface 58 of plate 38 and bottom bumper 46 is compressed, frame rail 20 and axle 40 are at their maximum distance from each other.

Figure 7:
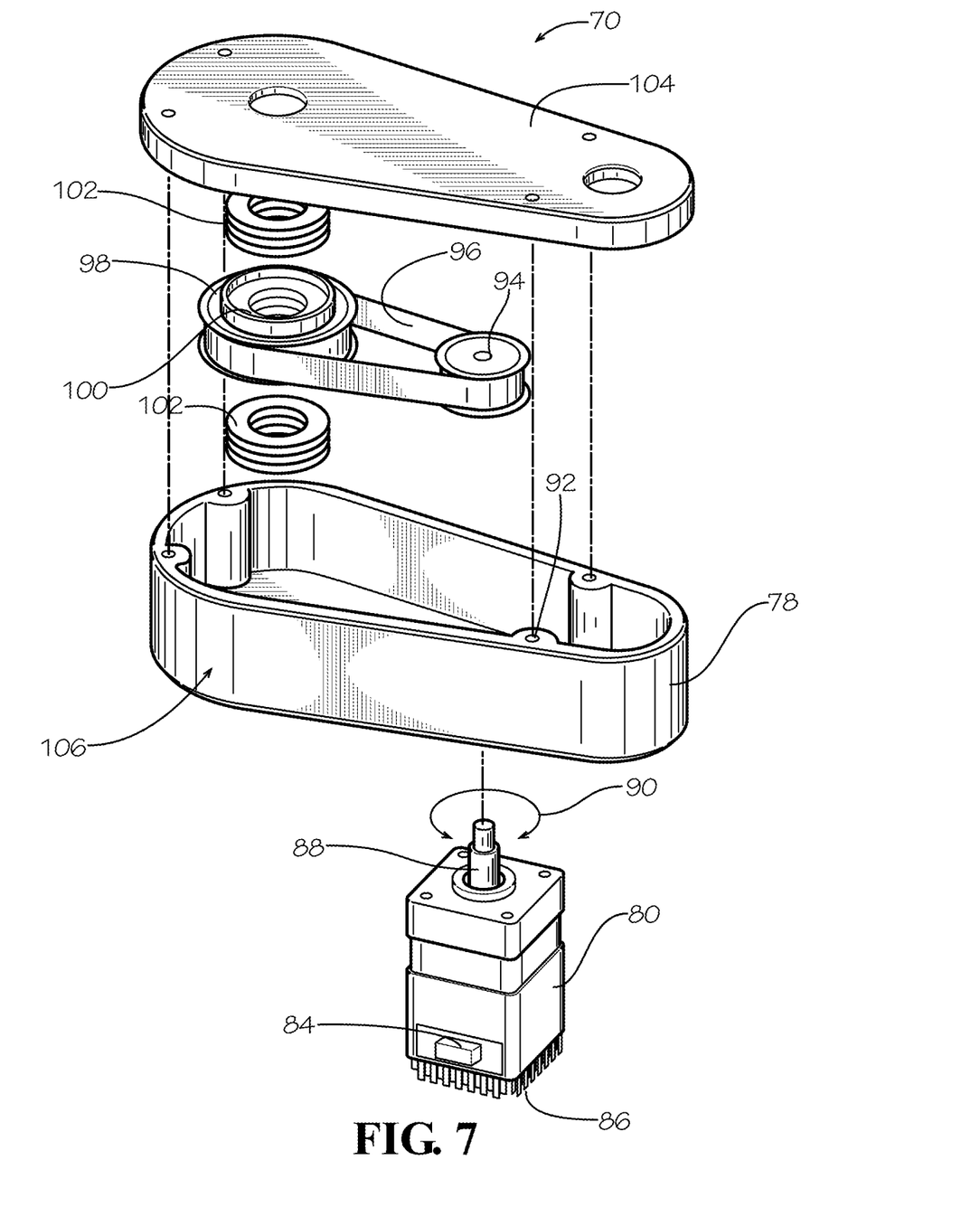
FIG. 7 is an exploded view of an upper motor housing of the adjustable limit bar of FIG. 6.

The distance between washer 36 of top bumper assembly 74 and washer 44 of bottom bumper assembly 76 is adjustable remotely and/or automatically via upper motor 80 of upper motor housing 70 and lower motor 82 of lower motor housing 72. FIG. 7 is an exploded view of upper motor housing 70. While upper motor 80 is described herein, in an exemplary embodiment, lower motor 82 is configured similarly. In an exemplary embodiment, motor 80 is an electrical motor that is connected to an electrical power source and controlling electronics through plug 84 in a conventional manner. An exemplary motor is commercially available as a "Bipolar Hybrid Stepper Motor" from Vetco Electronics of Bellevue, Wash. Cooling fingers 86 provide an increased surface area for heat dissipation from motor 80. When motor 80 is actuated, motor shaft 88 turns in the clockwise and counter-clockwise directions indicated by arrow 90. Motor shaft 88 extends through sleeve 92 of motor housing 70 and operably mates with belt retainer 94. Belt 96 is held on and around belt retainer 94 and pulley 98. Pulley 98 includes internally threaded bushing 100, which operably mates with externally threaded screw 66. A suitable pulley is commercially available as a "XL timing belt pulley" from Quality Transmission Components of Garden City Park, N.Y. Bushings 102 space pulley 98 from cover 104 and housing bottom 106.

As motor 80 turns motor shaft 88, belt retainer 94 turns therewith, thereby causing belt 96 to travel around belt retainer 94 and pulley 98. Belt 96 thereby turns pulley 98 and threaded bushing 100 therein. Rotation of threaded bushing 100 around screw 66 causes upper motor housing 70 to travel up or down screw 66, depending on the thread configuration and direction. In one embodiment, rotation of motor shaft 88 in a clockwise direction causes upper motor housing 70 to travel upward along screw 66, while rotation of motor shaft 88 in a counter-clockwise direction causes upper motor housing 70 to travel downward along screw 66. However, it is contemplated that the relationships may be otherwise.

In an exemplary embodiment, top bumper assembly 74 is attached to upper motor housing 70 to travel upward or downward along screw 66 therewith. Lower motor housing 72 may be independently controlled in a similar manner to move bottom bumper assembly 76 therewith along screw 66. In this manner, limit bar 60 is adjustable to limit the relative vertical travel between frame rail 20 and axle 40 to a range desired by the user.

FIG. 8 is a schematic diagram illustrating components of an exemplary embodiment of an adjustable limit bar assembly 112. In an exemplary embodiment, the movement of upper and lower motor housings 70, 72, and therefore of top bumper assembly 74 and bottom bumper assembly 76 is remotely and/or automatically controllable by an operator or a programmed or programmable controller 108 using a computer processor 110. In one embodiment, an operator increases or decreases a distance between top bumper assembly 74 and bottom bumper assembly 76 by inputting commands to the computer processor 110 via a user interface 114. In an exemplary embodiment, user interface 114 is an array of switches or a graphical user interface, for example, that is positioned in the cab of vehicle 10. A suitable controller is commercially available as the AGCONTROL™ controller on machines from AGCO Corporation of Duluth, Ga. The operator's commands are accepted into user interface 114 and relayed through controller 108 via wiring attached at plugs 84 to motors 80, 82 in a conventional manner. Additionally or alternatively, user interface 114 may present the operator with several pre-programmed setting options for selection.

When vehicle 10 travels on a paved road, it generally travels at a higher speed then when in a field. Vehicle 10 on a road may also make tighter turns than when in a field. Thus, on a road, many operators may prefer a stiffer ride, so that vehicle 10 exhibits relatively little sway. In this case, the vertical distance between top bumper assembly 74 and bottom bumper assembly 76 on each limit bar 60 is relatively small. In contrast, when vehicle 10 travels while spraying in a field, the travel speed is generally lower. Because the operator may be on vehicle 10 for an extended period of time, operator comfort is a higher priority. Thus, in the field, many operators may prefer a softer or smoother ride, so that vehicle 10 exhibits relatively more sway. Thus, user interface 114 may present pre-set options for selection designated as "road" or "field," for example. User interface 114 may also present options for selection such as "stiffer" or "softer," for example. Thus, in an exemplary embodiment of system 112, an operator may change the sway control offered by a system of adjustable limit bars 60, from the comfort of the vehicle cab through user interface 114 to reflect personal preference, field and/or road conditions, and task (e.g., loading), for example. Moreover, in an exemplary embodiment, each setting on each the four adjustable limit bars (left front limit bar 60a, right front limit bar 60b, left rear limit bar 60c and right rear limit bar 60d) of adjustable limit bar assembly 112 may be controlled independently.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A suspension system of a vehicle connecting a plurality of ground engaging wheels to a frame rail of the vehicle, the suspension system comprising:
    a forward axle and a rear axle, each axle connected to at least one of the plurality of ground engaging wheels, each of the forward and rear axles comprising a generally horizontal plate;
    at least one cushioning airbag mounted between the forward axle and the frame rail and at least one airbag mounted between the rear axle and the frame rail;
    a plurality of adjustable limiting assemblies configured to limit the relative vertical travel between the frame rail and the forward and rear axles, each of the plurality of adjustable limiting assemblies comprising:
    an elongated member having a longitudinal axis;
    an attachment mechanism disposed on an end of the elongated member and configured for attachment to the frame rail;
    a first bumper having a first spring rate and being co-axially disposed on the elongated member, the first bumper being positioned above the horizontal plate; and
    a second bumper having a second spring rate and being co-axially disposed on the elongated member and spaced from the first bumper, the second bumper being positioned below the horizontal plate; and
    a controller for adjusting the adjustable limiting assembly with respect to the horizontal plate in a range between a first position wherein the first bumper is proximate the plate and a second position wherein the second bumper is proximate the plate.

2. The system of claim 1 further comprising first and second washers co-axially disposed on the elongated member between the first bumper and the second bumper.

3. The system of claim 1 wherein the elongated member is an externally threaded screw.

4. The system of claim 1 further comprising a motor configured to move the first bumper along the elongated member.

5. The system of claim 4 further comprising a belt operably connecting the motor and the elongated member.

6. The system of claim 4 further comprising a housing to which the motor is attached.

7. The system of claim 6 further comprising a guide rod on which the housing moves as the first bumper moves along the elongated member.

8. The system of claim 1 wherein the first and second spring rates are not equal.

9. The system of claim 1 wherein the first and second spring rates are equal.

10. The system of claim 1 wherein at least one of the first and second bumpers comprises an elastomer.

11. A suspension system of a vehicle connecting a plurality of ground engaging wheels to a frame rail of the vehicle, the suspension system comprising:
    a forward axle and a rear axle, each axle connected to at least one of the plurality of ground engaging wheels, each of the forward and rear axles comprising a generally horizontal plate;
    at least one cushioning airbag mounted between the forward axle and the frame rail and at least one airbag mounted between the rear axle and the frame rail;
    a plurality of adjustable limiting assemblies configured to limit the relative vertical travel between the frame rail and the forward and rear axles, each of the plurality of adjustable limiting assemblies comprising:
    an elongated member having a longitudinal axis;
    an attachment mechanism disposed on an end of the elongated member and configured for attachment to the frame rail;
    a first bumper having a first spring rate and being co-axially disposed on the elongated member, the first bumper being positioned above the horizontal plate; and
    a second bumper having a second spring rate and being co-axially disposed on the elongated member and spaced from the first bumper, the second bumper being positioned below the horizontal plate;
    a controller for adjusting the adjustable limiting assembly with respect to the horizontal plate in a range between a first position wherein the first bumper is proximate the plate and a second position wherein the second bumper is proximate the plate; and
    a user interface configured to accept user input commands and relay the commands to the controller for adjusting a distance that the second bumper is spaced from the first bumper.

12. The system of claim 11 wherein the system is one of a plurality of such systems, and wherein the controller adjusts the distance that the second bumper is spaced from the first bumper of each of the plurality of systems independently.

* * * * *